United States Patent Office 3,553,574
Patented Jan. 5, 1971

3,553,574
CAPACITANCE CURRENT-FLUX MEASURING DEVICE
Livingston L. Rice and Richard L. Rollins, Williamstown, Mass., assignors to Sprague Electric Company, North Adams, Mass., a corporation of Massachusetts
Continuation-in-part of application Ser. No. 550,260, May 16, 1966. This application Feb. 3, 1969, Ser. No. 801,917
Int. Cl. G01n 11/52
U.S. Cl. 324—60
4 Claims

ABSTRACT OF THE DISCLOSURE

The device includes means for energizing a capacitor with voltage from an alternating current source so as to provide a capacitor current, and means for multiplying said current in inverse proportion to the magnitude and frequency of said voltage so as to provide a current response which in standard units of current is numerically equal to the capacitance of said capacitor in standard units of capacitance.

CROSS REFERENCES TO RELATED APPLICATIONS

This application is a continuation-in-part of copending application S.N. 550,260 filed in the names of Livingston L. Rice and Richard L. Rollins on May 16, 1966, now abandoned.

BACKGROUND OF THE INVENTION

This invention relates generally to measuring devices and more particularly to a device for measuring capacitance.

Although various means for measuring voltage and current, such as magnetic flux sensing ammeters, are available to technicians concerned with the construction, installation and repair of electrical equipment a means of measuring capacitance is generally not available since the latter is usually determined by costly, delicate, bridge instruments.

It is an object of this invention to provide an inexpensive device which measures capacitance by means of the AC current flow through the test component under known input conditions.

It is another object of this invention to provide a capacitance measuring device which automatically multiplies the value of capacitor current to directly indicate in units of current, the capacitance in units of capacitance.

It is a further object of this invention to provide a device for measuring capacitance which utilizes a conventional magnetic flux sensing ammeter.

It is a still further object of this invention to provide a capacitance measuring device in which the amperage reading of a conventional ammeter is made numerically equivalent to the capacitance of the component being measured.

These and other objects of this invention will become more apparent upon consideration of the following description taken together with the drawing.

SUMMARY OF THE INVENTION

In accordance with the invention, a device for measuring capacitance by means of current flow through the capacitor comprises input means adapted for connection of said capacitor to a source of alternating current, a multiplier coupled to said input means and adapted for coupling to an ammeter, and said multiplier adapted to automatically multiply the resultant current flow of said capacitor so as to provide a current response in standard units of current which is numerically equivalent to the capacitance in standard units of capacitance whereby the scalar current value registered by said ammeter is directly readable in capacitance.

In the preferred embodiment, an air core winding is provided in series with an input means, which provides connection to an alternating voltage source, and terminals suitable for connection to a capacitor. A capacitor discharge means is provided in combination with a switch to discharge the capacitor after test, and a flux sensing ammeter is employed. Sufficient windings are employed in the coil to provide an apparent multiplication of capacitor current such that a direct measurement in amperes will equal the capacitance value in microfarads.

DESCRIPTION OF THE PREFERRED EMBODIMENTS

Figure 1:
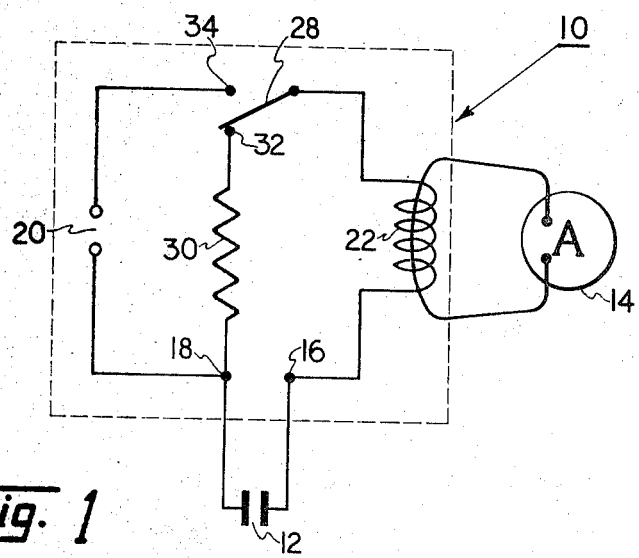
FIG. 1 is a schematic diagram of a capacitance measuring device provided in accordance with the invention.

In FIG. 1 an energizing and multiplying network 10 is shown in connection to a test capacitor 12 and an ammeter 14. Capacitor 12 is connected to network 10 by terminal means 16, 18 which are connected in turn, to an input means, or source connection 20. A winding 22, or coil or the like and a switch 28 are provided in series with terminals 16, 18 and input 20. The ammeter 14 is coupled to winding 22 by any suitable means such as by passing a conductive loop through the core of winding 22. Ammeter 14 is a conventional snap-on ammeter or the like which is designed for magnetic coupling to the circuit being measured; for example, an ammeter of type described in U.S. Patent No. 2,927,270 issued to R. Wilton on Mar. 1, 1960 will be suitable. Winding 22 operates to provide a magnetic field intensity at its center which is a multiple of that of a single turn; that is, it multiplies the magnetic field intensity resulting from capacitor current, and in conjunction with the ammeter loop operates as a current multiplier or transformer which multiplies the capacitor current substantially in accordance with the number of turns of winding 22.

To operate the measuring device, an alternating voltage such as 115 volts, 60 c.p.s. is applied to input means 20 and switch 28 then activated to apply the voltage to capacitor 12 through terminals 16, 18. In such circumstances, a current directly proportional to the capacitance of capacitor 12 will flow in network 10 and through winding 22. The flux of winding 22, will, however, be multiplied in proportion to the number of turns N of winding 22, so that the current indicated by ammeter 14 is N times the capacitor current.

With a low resistance network (primarily winding 22), the voltage applied to the capacitor is essentially the same as the source voltage such that the capacitor current, or that is the actual current flowing in network 10, is a function of the amplitude and frequency of source 20 as well as the capacitance of the test capacitor, and can be determined from the equation: $I = 10^{-6} \omega CE$ where:

$I$ = current in amperes
$\omega = 2\pi F$ and F is the frequency in c.p.s.
$C$ = capacitance in microfarads
$E$ = the applied voltage in volts In the preferred embodiment, winding 22 varies the magnetic field intensity of the actual current I to provide a field intensity representative of a current which is $$\left(\frac{10^{+6}}{\omega E}\right)I$$

Thus, since $$C = \left(\frac{10^{+6}}{\omega E}\right)I$$

the circuit provides a current response in amperes equal to the capacitance in microfarads. In other words, the capacitor current flowing in circuit 10 is automatically multiplied such that its value in amperes is numerically equal to the capacitance in microfarads, and a conventional current scale calibrated in amperes will be directly readable in microfarads or other standard units of capacitance. This is accomplished, in the preferred embodiment, by winding 22 which multiplies the magnetic flux resulting from the capacitor current thereby causing a current reading by ammeter 14 which is equivalent to the capacitance in microfarads. Similarly, a further multiplication of $10^6$ by multiplier 22 will provide a direct reading in picofarads. This, however, provides an undesirable increase in the resistance of winding 22 and decreases the accuracy of the device.

Figure 2:
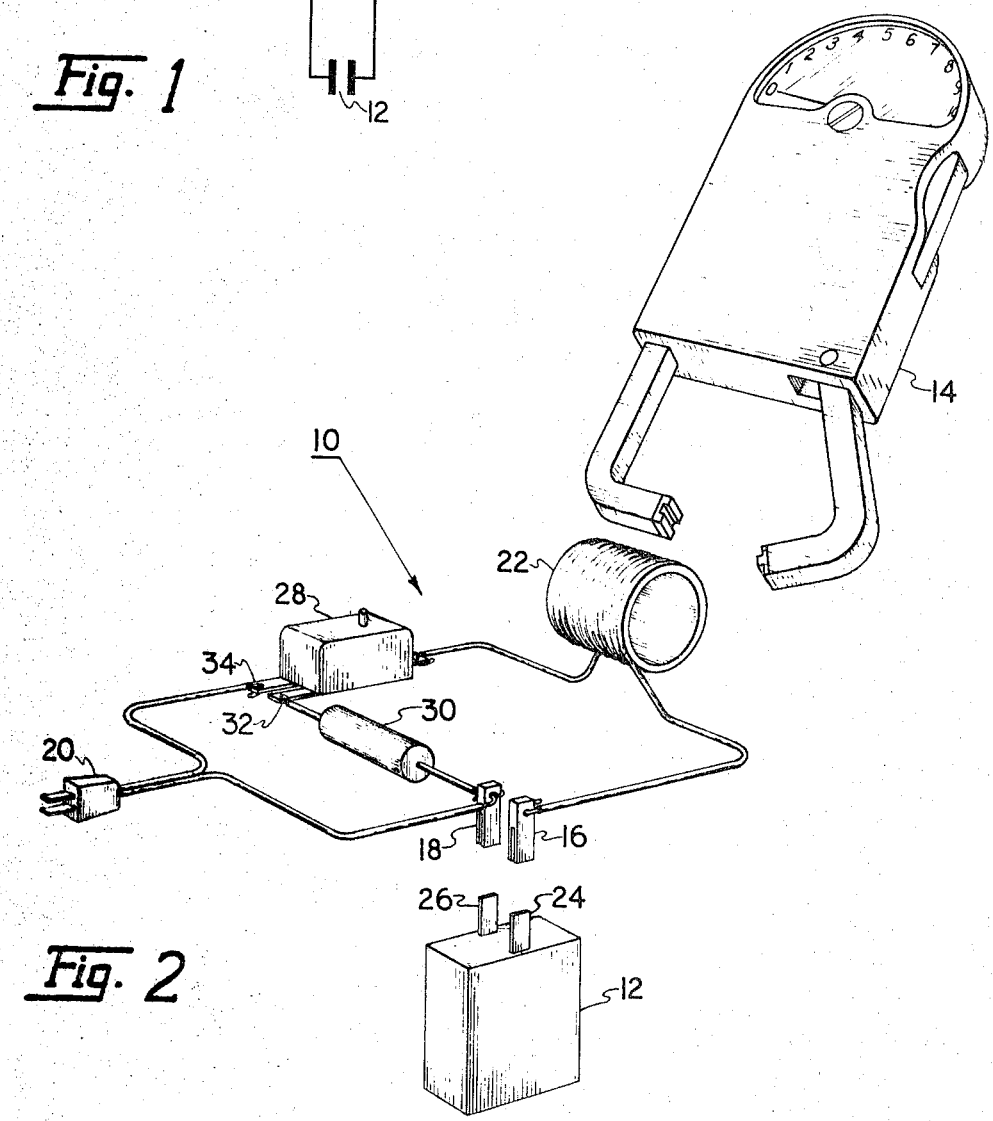
FIG. 2 is a perspective view of elements utilized in the circuit of FIG. 1.

As illustrated in FIG. 2, winding 22 is provided in series with an input means, or plug 20, and terminal means 16, 18. A flux sensing, snap-on type ammeter 14 is shown with an open test loop, and a test capacitor 12 is positioned adjacent terminals 16, 18. A single pole double throw switch 28 is connected between the source 20 and winding 22. The switch, which may be a push button type, is normally in contact with terminal 32 so as to provide a discharge means 30 in parallel with terminal means 16, 18. Upon operation, switch 28 connects contact 34 (and input means 20) to terminals 16, 18 and opens the parallel discharge path 30.

The device is operated by joining the capacitor connections 24, 26 to terminals 16, 18 and connecting the plug 20 to a suitable A.C. source. Switch 28 is then depressed to open the discharge path 30 and connect the capacitor to the source. Then, winding 22 multiplies the flux of the capacitor current by $10^6/\omega E$ so that the apparent current provides an indicated reading of ammeter 14 (when its loop is closed through coil 22) numerically equal to the capacitance of capacitor 12. Thus, the current scale of ammeter 14 is directly readable in capacitance as well as current.

As indicated, for amperes to microfarad equivalency, winding 22 must increase the effect of the capacitor current by $10^6/\omega E$. Thus for 115 volts, 60 c.p.s. the multiplier constant will equal 23.1, and the winding will require approximately this many turns. However, the mutual inductance of the windings must also be taken into account. Thus for windings provided by turns of insulated wire, or the like, the number of turns is reduced to approximately twenty-two turns in the above case. The mutual inductance, however, can be minimized by using convolutely wound metal foil, in which case twenty-three turns is satisfactory for use with the indicated source. Thus, various types of windings may be employed, but, since the current through the capacitor is the controlling characteristic, the winding should be low in resistance; in the order of a few ohms or less.

A discharge means 30 of approximately 500 ohms is suitable since it is desirable to discharge the capacitor quickly enough to provide for the safety of the test operator without placing undue stress on the circuit components. The discharge means may, of course, be incorporated in the circuit in many ways. For example, resistor 30, as illustrated, provides a discharge loop through the coil and capacitor, however, it could be connected directly across the capacitor so as to eliminate any discharge through the coil. Furthermore, a much higher resistance could be permanently connected across terminals 16, 18 as a discharge means. This would, of course, provide a small error in the capacitance measurement since the resistor would contribute to the current of coil 22.

Although a snap-on ammeter is preferred, any flux sensing ammeter could be employed. In addition, circuit 10 or portions of it could be incorporated within the meter casing.

For example, a flux multiplier or other type multiplier could be incorporated with a current meter to allow the automatic reading of capacitance. Thus many different modifications may be made in the invention without departing from the scope thereof.

What is claimed is:

1. A device for measuring capacitance by applying a known source of alternating voltage to the capacitor and evaluating the resulting current flow thereof, said device comprising: a winding having a number of turns proportional to $10^6$ divided by the source voltage in volts and the source frequency in cycles per second; input means for connection to said source; terminal means for connection to said capacitor, conducting means for connection between said input means and said terminal means for application of said alternating voltage thereto and for conduction of the resulting current of said capacitor; said conducting means coupled to said winding such that said current flows therein; an ammeter having a conductive loop, said ammeter adapted for indicating the current of said loop in standard units of current; and said loop magnetically coupled to said winding such that the value of current indicated by said ammeter in standard units of current is numerically equal to the capacitance of said capacitor in standard units of capacitance and directly readable therein.

2. A device as claimed in claim 1 wherein said winding has a number of turns equal to $10^6$ divided by said source voltage and frequency so as to provide a magnetic field having an intensity equivalent to a current whose magnitude in amperes equals the capacitance in microfarads of said capacitor.

3. A device as claimed in claim 2 wherein said ammeter is a snap-on ammeter adapted for coupling to said winding by closing its conductive loop within the core of said winding.

4. A device as claimed in claim 3 for use with a 115 volt, 60 c.p.s. source wherein said winding has approximately twenty-three turns so as to provide a magnetic flux multiplication of about twenty-three such that said ammeter will indicate in amperes a current value equal to the capacitance in microfarads.

References Cited

UNITED STATES PATENTS

| | | | |
|---|---|---|---|
| 380,943 | 4/1888 | Shallenberger | 324—127 |
| 446,492 | 2/1891 | Weston | 324—127 |
| 894,620 | 7/1908 | Frank | 324—127 |
| 1,489,665 | 4/1924 | Foster et al. | 324—127 |
| 2,455,543 | 12/1948 | Williams | 324—60 |
| 2,783,437 | 2/1957 | Yenni et al. | 324—127X |
| 2,922,110 | 1/1960 | Miller | 324—127X |
| 2,927,270 | 3/1960 | Wilton | 324—127X |

OTHER REFERENCES

Turner, R. P., Microfarad Meters, in Radio News, December 1945. pp. 46–47, 144–147.

Queen, I., Measuring Capacity, in Radio-Craft, July 1944, pp. 602–603, 635.

EDWARD E. KUBASIEWICZ, Primary Examiner

U.S. Cl. X.R.

324—127